(12) United States Patent
Wennersten et al.

(10) Patent No.: US 10,911,773 B2
(45) Date of Patent: Feb. 2, 2021

(54) MOTION VECTOR DIFFERENCE CODING AND DECODING

(71) Applicant: Telefonaktiebolaget LM Ericsson (publ), Stockholm (SE)

(72) Inventors: Per Wennersten, Årsta (SE); Ruoyang Yu, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 57 days.

(21) Appl. No.: 16/097,344

(22) PCT Filed: May 12, 2017

(86) PCT No.: PCT/EP2017/061531
§ 371 (c)(1),
(2) Date: Oct. 29, 2018

(87) PCT Pub. No.: WO2017/194773
PCT Pub. Date: Nov. 16, 2017

(65) Prior Publication Data
US 2019/0141346 A1    May 9, 2019

Related U.S. Application Data

(60) Provisional application No. 62/335,998, filed on May 13, 2016.

(51) Int. Cl.
*H04N 19/52* (2014.01)
*H04N 19/46* (2014.01)
*H04N 19/467* (2014.01)

(52) U.S. Cl.
CPC .............. *H04N 19/52* (2014.11); *H04N 19/46* (2014.11); *H04N 19/467* (2014.11)

(58) Field of Classification Search
CPC .................................................... H04N 19/513
See application file for complete search history.

(56) References Cited

U.S. PATENT DOCUMENTS

2012/0189055 A1    7/2012   Chien et al.
2013/0235936 A1*   9/2013   Campbell ............ H04N 19/467
                                             375/240.16

FOREIGN PATENT DOCUMENTS

EP        2618572 A1    7/2013
EP        2637409 A1    9/2013

OTHER PUBLICATIONS

Samuelsson, J., "Motion vector coding optimization", Joint Video Exploration Team (JVET), of ITU-T SG 16 WP 3 and ISO/IEC JTC 1/SC29/WG 11, 3rd Meeting, Geneva, Document JVET-C0068, May 26, 2016, pp. 1-3, ISO.

(Continued)

*Primary Examiner* — Xiaolan Xu
(74) *Attorney, Agent, or Firm* — Coats + Bennett, PLLC

(57) ABSTRACT

There are provided mechanisms for encoding a motion vector, wherein the motion vector is represented by a sum of a motion vector prediction (MVP) and a motion vector difference (MVD) between the motion vector and the MVP. The MVD comprises a first MVD component y and a second MVD component x. The method comprises encoding the first MVD component y. The method comprises encoding a representation $\hat{x}$ of the second MVD component x. The method comprises sending information to a video decoder on how reconstruct the second MVD component x from the representation $\hat{x}$ of the second MVD component x and at least one of: the first MVD component y, MVP index MVPindex, reference picture index RefIdx, reference picture list flag, block partition size PartSize and block partition type. There are provided mechanisms for reconstructing a motion vector from a motion vector prediction (MVP) and (Continued)

a motion vector difference (MVD). The MVD comprises a first MVD component y and a second MVD component x. The method comprises receiving information from a video encoder on how to reconstruct the second MVD component x from a representation x of the second MVD component x and at least one of: the first MVD component y, MVP index MVPindex, reference picture index RefIdx, reference picture list flag, block partition size PartSize and block partition type. The method comprises decoding the first MVD component y. The method comprises decoding the representation x of the second MVD component x. The method comprises reconstructing the second MVD component x in accordance with the received information.

4 Claims, 6 Drawing Sheets

(56) References Cited

OTHER PUBLICATIONS

Clare, G., "Sign Data Hiding", Joint Collaborative Team on Video Coding (JCT-VC) of ITU-T SG16 WP3 and ISO/IEC JTCI/SC29/WG11, 7th Meeting, Geneva, Document: JCTVS-G271, Nov. 21, 2011, pp. 1-9, ISO.

* cited by examiner

MOTION VECTOR DIFFERENCE CODING AND DECODING

TECHNICAL FIELD

Embodiments herein relate to the field of video coding, such as High Efficiency Video Coding (HEVC) or the like. In particular, embodiments herein relate to a method and a video encoder for encoding a motion vector, wherein the motion vector is represented by a sum of a motion vector prediction (MVP) and a motion vector difference (MVD) between the motion vector and the MVP. Embodiments herein relate to a method and a video decoder for reconstructing a motion vector from a motion vector prediction (MVP) and a motion vector difference (MVD). Corresponding computer programs therefor are also disclosed.

BACKGROUND

High Efficiency Video Coding (HEVC), also known as H.265, is a block based hybrid video codec, standardized by the Telecommunication Standardization Sector of the International Telecommunications Union (ITU-T) and the Moving Pictures Experts Group (MPEG), that utilizes both temporal and spatial prediction.

Pictures in a video sequences are divided into small square units as bases for encoding. In HEVC, these units are referred to as coding unit (CU) which can range from size of 8×8 to 64×64. Each unit can be further partitioned into smaller blocks for spatial or temporal prediction. Up to 4 symmetric and 4 asymmetric partition structures are supported for better capturing characteristics for different video content.

Spatial prediction, which is also called intra prediction, is achieved by predicting current block using previous decoded blocks within the same picture. A picture consisting of only intra-predicted blocks is referred as an I-picture. As I-pictures do not have any dependency on any other pictures, they provide starting points for encoding or decoding. Therefore, the first picture inside a video sequence is typically encoded as an I-picture.

Temporal prediction, also known as inter prediction, is achieved by predicting blocks in a current picture using blocks from previous decoded pictures, the so-called reference pictures, along with motion vectors indicating the movement between the pictures. Temporal prediction is achieved using inter (P) prediction, i.e., prediction from one block in one reference picture, or bi-directional inter (B) prediction, i.e. prediction from blending of two blocks in one or two reference pictures. A picture containing only P-predicted blocks is referred as a P-picture. A picture that contains at least one bi-predicted block is referred as a B-picture.

When encoding a picture, it is possible to have several reference pictures. These reference pictures are grouped into two lists. The reference pictures that are displayed before the current picture are usually grouped into list 0 while the reference pictures that are displayed after the current picture are usually grouped into list 1. For signaling the usage of a specific reference picture for current block, a reference picture list flag and a reference picture index are needed to be encoded. The reference picture list flag specifies which reference picture list to use, while the reference picture index specifies the targeted reference picture's index inside the list.

The position of a referenced block is indicated using motion vector (MV). Each MV consists of x and y components that signal the displacements between current block and the referenced block. The MV may point to full-pel (full-pixel), half-pel (half-pixel) and quarter-pel (quarter-pixel) samples. Half-pel and quarter-pel samples are generated by interpolating their corresponding neighboring full-pel samples. For an encoded video bitstream, MVs can constitute up to about 50% of the total bitrate.

Since a moving object in a picture may span across several blocks, the MV of the current block is usually highly correlated with neighboring blocks' MVs. Thus, one way of improving the compression efficiency is to predict current MV from neighboring MVs. A common motion vector prediction process begins with constructing a list of neighboring MVs which is referred to as MVP list, selects one of them as motion vector predictor (MVP) and then calculates the motion vector difference (MVD) between the predictor and current MV. Therefore, instead of encoding a "full" MV, only the MVP index which tells the index of the selected MVP inside the MVP list and the corresponding MVD are encoded. FIG. 1 shows an example of motion vector prediction. The current MV (−2,4) is to be predicted from a list of two MVP candidates: a MV with index 0 and having a value (24,9) and a MV with index 1 and having a value (−4,7). As the current MV is closer to the MV with index 1, the MV with index 1 is chosen as the MVP candidate. What is being encoded is the MVP index 1 and the MVD (2, −3), i.e., the difference between the current MV (−2, 4) and the MVP candidate (−4,7). As shown in the figure, the MVD has x and y components. Each of them consists of two parts: magnitude part and sign part. These two parts are usually encoded separately.

SUMMARY

The problem with motion vector prediction is that there still exists redundancy in motion vector difference encoding which leaves room for further improving compression efficiency. In order to reduce a bitrate or, equivalently, increase coding efficiency, a method and arrangements for encoding and decoding of motion vectors are provided.

A first aspect of the embodiments defines a method performed by a video encoder, for encoding a motion vector, wherein the motion vector is represented by a sum of a motion vector prediction (MVP) and a motion vector difference (MVD) between the motion vector and the MVP. The MVD comprises a first MVD component y and a second MVD component x. The method comprises encoding the first MVD component y. The method comprises encoding a representation $\hat{x}$ of the second MVD component x. The method comprises sending information to a video decoder on how reconstruct the second MVD component x from the representation $\hat{x}$ of the second MVD component x and at least one of: the first MVD component y, MVP index MVPindex, reference picture index RefIdx, reference picture list flag, block partition size PartSize and block partition type.

A second aspect of the embodiments defines a video encoder, for encoding a motion vector, wherein the motion vector is represented by a sum of a motion vector prediction (MVP) and a motion vector difference (MVD) between the motion vector and the MVP. The MVD comprises a first MVD component y and a second MVD component x. The video encoder comprises processing means operative to encode the first MVD component y. The video encoder comprises processing means operative to encode a representation $\hat{x}$ of the second MVD component x. The video encoder comprises processing means operative to send information to a video decoder on how reconstruct the second MVD component x from the representation $\hat{x}$ of the second MVD component x and at least one of: the first MVD component y, MVP index MVPindex, reference picture index RefIdx, reference picture list flag, block partition size PartSize and block partition type.

A third aspect of the embodiments defines a computer program, for encoding a motion vector, wherein the motion vector is represented by a sum of a motion vector prediction (MVP) and a motion vector difference (MVD) between the motion vector and the MVP. The MVD comprises a first MVD component y and a second MVD component x. The computer program comprises code means which, when run on a computer, causes the computer to encode the first MVD component y. The computer program comprises code means which, when run on a computer, causes the computer to encode a representation $\hat{x}$ of the second MVD component x. The computer program comprises code means which, when run on a computer, causes the computer to send information to a video decoder on how reconstruct the second MVD component x from the representation $\hat{x}$ of the second MVD component x and at least one of: the first MVD component y, MVP index MVPindex, reference picture index RefIdx, reference picture list flag, block partition size PartSize and block partition type.

A fourth aspect of the embodiments defines a computer program product comprising computer readable means and a computer program according to the third aspect, stored on the computer readable means.

A fifth aspect of the embodiments defines a method, performed by a video decoder, for reconstructing a motion vector from a motion vector prediction (MVP) and a motion vector difference (MVD). The MVD comprises a first MVD component y and a second MVD component x. The method comprises receiving information from a video encoder on how to reconstruct the second MVD component x from a representation $\hat{x}$ of the second MVD component x and at least one of: the first MVD component y, MVP index MVPindex, reference picture index RefIdx, reference picture list flag, block partition size PartSize and block partition type. The method comprises decoding the first MVD component y. The method comprises decoding the representation $\hat{x}$ of the second MVD component x. The method comprises reconstructing the second MVD component x in accordance with the received information.

A sixth aspect of the embodiments defines a video decoder, for reconstructing a motion vector from a motion vector prediction (MVP) and a motion vector difference (MVD). The MVD comprises a first MVD component y and a second MVD component x. The video decoder comprises processing means operative to receive information from a video encoder on how to reconstruct the second MVD component x from a representation $\hat{x}$ of the second MVD component x and at least one of: the first MVD component y, MVP index MVPindex, reference picture index RefIdx, reference picture list flag, block partition size PartSize and block partition type. The video decoder comprises processing means operative to decode the first MVD component y. The video decoder comprises processing means operative to decode the representation $\hat{x}$ of the second MVD component x. The video decoder comprises processing means operative to reconstruct the second MVD component x in accordance with the received information.

A seventh aspect of the embodiments defines a computer program, for reconstructing a motion vector from a motion vector prediction (MVP) and a motion vector difference (MVD). The MVD comprises a first MVD component y and a second MVD component x. The computer program comprises code means which, when run on a computer, causes the computer to receive information from a video encoder on how to reconstruct the second MVD component x from a representation $\hat{x}$ of the second MVD component x and at least one of: the first MVD component y, MVP index MVPindex, reference picture index RefIdx, reference picture list flag, block partition size PartSize and block partition type.

The computer program comprises code means which, when run on a computer, causes the computer to decode the first MVD component y. The computer program comprises code means which, when run on a computer, causes the computer to decode the representation $\hat{x}$ of the second MVD component x. The computer program comprises code means which, when run on a computer, causes the computer to reconstruct the second MVD component x in accordance with the received information.

An eight aspect of the embodiments defines a computer program product comprising computer readable means and a computer program according to the seventh aspect, stored on the computer readable means.

Advantageously, at least some of the embodiments provide a reduced bitrate, without introducing noticeable decoding complexity.

It is to be noted that any feature of the first, second, third, fourth, fifth, sixth, seventh and eighth aspects may be applied to any other aspect, whenever appropriate. Likewise, any advantage of the first aspect may equally apply to the second, third, fourth, fifth, sixth, seventh and eighth aspect respectively, and vice versa. Other objectives, features and advantages of the enclosed embodiments will be apparent from the following detailed disclosure, from the attached dependent claims and from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention, together with further objects and advantages thereof, may best be understood by referring to the following description taken together with the accompanying drawings, in which.

DETAILED DESCRIPTION

The accompanying drawings, which are incorporated herein and form part of the specification, illustrate various embodiments of the present invention and, together with the description, further serve to explain the principles of the invention and to enable a person skilled in the art to make and use the invention.

Even though the description of the invention is based on the HEVC codec, it is to be understood by a person skilled in the art that the invention could be applied to any other state-of-the-art and a future block-based video coding standard.

The present embodiments generally relate to a method and an encoder for encoding a motion vector, wherein the motion vector is represented by a sum of a motion vector prediction and a motion vector difference between the motion vector and the MVP, as well as a method and a decoder for reconstructing a motion vector from a motion vector prediction and a motion vector difference.

Figure 1:
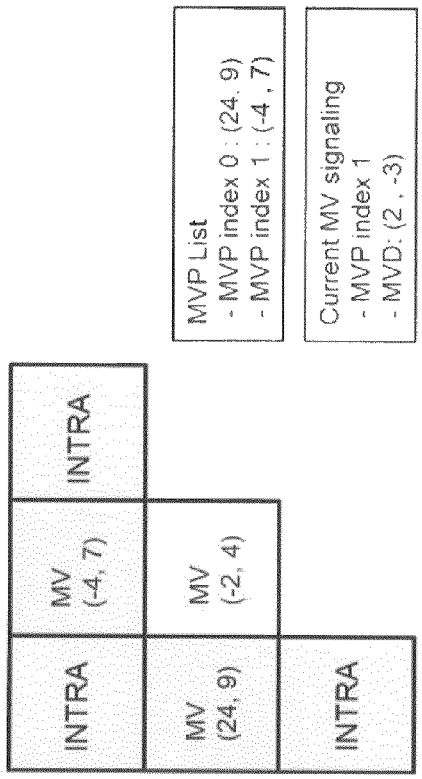
FIG. 1 illustrates an example of motion vector prediction according to the prior art.
Figure 2:
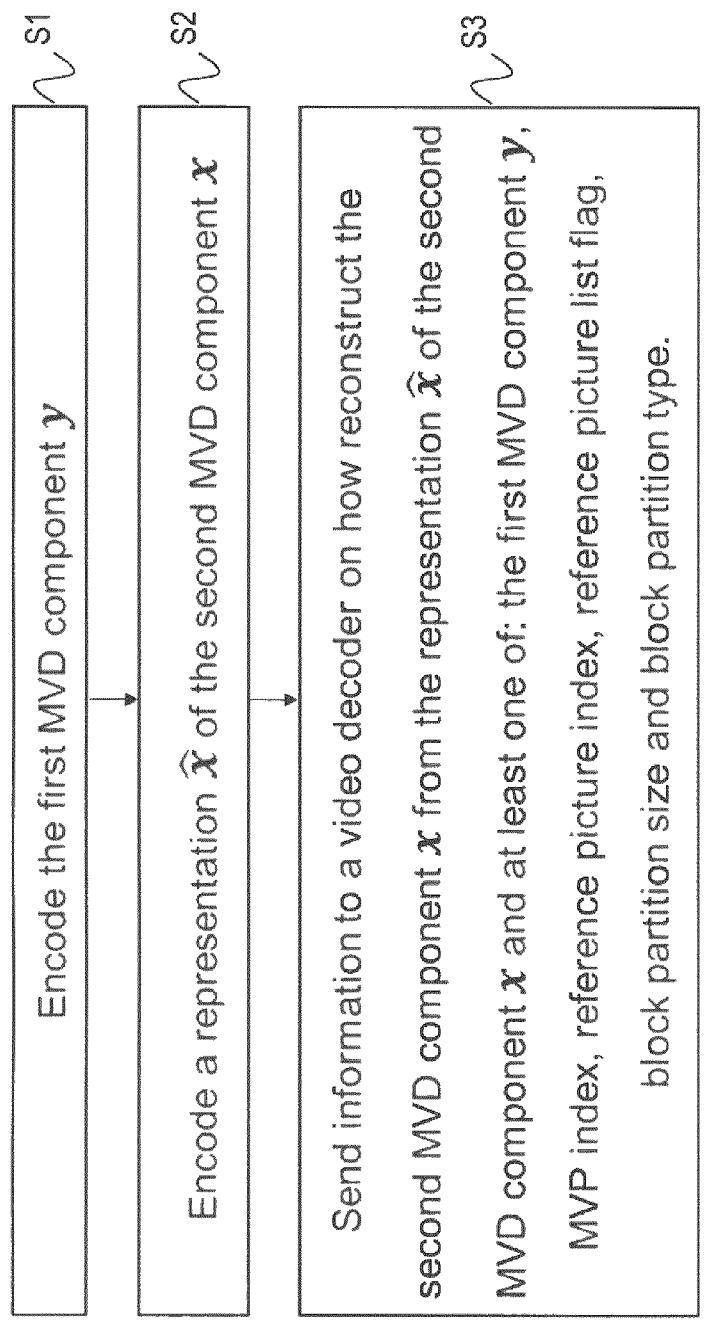
FIG. 2 illustrates the steps performed in an encoding method according to the embodiments of the present invention.

According to one aspect, a method, performed by a video encoder, for encoding a motion vector is provided, as described in FIG. 2. The motion vector is represented by a sum of a motion vector prediction (MVP) and a motion vector difference (MVD) between the motion vector and the MVP. The MVD comprises a first MVD component y and a second MVD component x. The method comprises a step S1 of encoding the first MVD component y. The first MVD component y may, for example, be encoded as is currently done in HEVC.

The method comprises a step S2 of encoding a representation $\hat{x}$ of the second MVD component x. The representation $\hat{x}$ may be a reduced size version of the second MVD component x, i.e., may carry a part of the second MVD component x. For example, it may be an incomplete version of x, obtained by removing at least one bit of the second MVD component x. Typically, the representation may contain all but the least significant bit of the second MVD component, in which case the parity of the second MVD component is removed, or all but the most significant bit of the second MVD component, in which case the sign of the MVD component is removed and the representation corresponds to the magnitude of the second MVD component. More details about the representation $\hat{x}$ will be given below.

The method comprises a step S3 of sending information to a video decoder on how reconstruct the second MVD component x from the representation $\hat{x}$ of the second MVD component x and at least one of: the first MVD component y, MVP index MVPindex, reference picture index RefIdx, reference picture list flag, block partition size PartSize and block partition type. This in principle means that the representation $\hat{x}$ is created in such a way that the second MVD component x can be reconstructed from $\hat{x}$ and at least one of: the first MVD component y and syntax elements such as MVP index, reference picture index, reference picture list flag, block partition size, block partition type etc. Sending this information (i.e., signaling information) ensures identical reconstruction at the video decoder. The video decoder is this way informed about how the reconstruction of the second MVD component and the MVD accordingly needs to be performed, i.e., which parts of the MVD components and syntax elements are used and what operation needs to be performed on them.

The semantics of each aforementioned syntax elements are as follows: MVP index specifies the MVP candidate index in a MVP list; reference picture list flag specifies which reference picture list of usage, i.e. list 0 or list 1; reference picture index specifies the index of the targeted reference picture inside the reference picture list; block partition size specifies the partitioning size and block partition type specifies the partitioning structure. As can be seen, these elements contain various prediction information for an inter-coded block. Therefore, it gives the video encoder additional freedom of deciding a best way to represent $\hat{x}$ by selectively using these syntax elements. As will be further seen below, the identical reconstruction needs to be performed at both the video encoder and the video decoder in order to correctly reconstruct the second MVD component x.

Sending (signaling) information may be done, but is not limited to, by using a sequence parameter set (SPS), picture parameter set (PPS) or video parameter set (VPS). The information may also be sent "offline", i.e., the video encoder and the video decoder may exchange in advance the details of the reconstruction process.

According to the first embodiment of the present invention, the representation $\hat{x}$ of the second MVD component x corresponds to a magnitude of the second MVD component x. The sign of the second MVD component x is reconstructed as:

Sign(x)=(Magnitude(x)XOR Magnitude(y)XOR Part Size XOR RefIdx) AND 0x01, wherein XOR is an exclusive OR logical operation, and AND is a logical AND operation. In this expression, Magnitude(x) and Magnitude(y) respectively refer to the magnitudes of the second and first MVD components, and PartSize and RefIdx refer to refers to a block partition size and a reference picture index, as described above. 'AND 0x01' in the expression above means that only the last bit of the operation (Magnitude(x)XOR Magnitude(y)XOR PartSize XOR RefIdx) is taken as the Sign(x). Sign(x) may also be referred to as the most significant bit of x, or MSB(x).

According to this embodiment, the sign of the second MVD component x is not encoded, i.e., it is not sent to a video decoder. Instead, Sign(x) is reconstructed at the decoder from the sent information that tells to use the expression above. Not encoding a bit of the second MVD component, while knowing how to reconstruct it, results in bitrate savings. This also implies that the reconstruction process of the second MVD component, according to this embodiment, needs to be identical at the video encoder and the video decoder side, as mentioned above.

According to the second embodiment of the present invention, the representation $\hat{x}$ of the second MVD component x comprises all but the least significant bit of the second MVD component x, LSB(x). The least significant bit of the second MVD component x is, according to this embodiment, embedded (contained) in the parity information (i.e. the least significant bit) of the first MVD component y, LSB(y), and the MVP index:

LSB(x)=(LSB(y)XOR MVPindex) AND 0x01.

In this case, the second MVD component x is reconstructed as:

$$x=2\hat{x}+((LSB(y) \text{ XOR MVPindex}) \text{ AND } 0x01).$$

Similar as above, 'AND 0x01' in the expression above means that only the last bit of the operation LSB(y) XOR MVPindex is taken as LSB(x). The same operation is performed at the video encoder and the video decoder, so that the least significant bit of the second MVD component x does not need to be sent.

This embodiment may also be generalized such that a bit other than the LSB is embedded in a corresponding bit from the first MVD component.

According to the third embodiment of the present invention, the representation $\hat{x}$ of the second MVD component x comprises all but the least significant bit of the second MVD component x, LSB(x). However, in this case, the least significant bit of the second MVD component is obtained by combining multiple syntax elements:

$$LSB(x)=(LSB(y) \text{ XOR MVPindex XOR RefIdx XOR PartSize}) \text{ AND } 0x01.$$

In this case the second MVD component x is reconstructed as:

$$x=2\hat{x}+(LSB(y) \text{ XOR MVPindex XOR RefIdx XOR PartSize}) \text{ AND } 0x01.$$

Similar as in the second embodiment above, this embodiment may also be generalized such that a bit other than the LSB is embedded in a corresponding bit from the first MVD component.

According to the fourth embodiment of the present invention, the representation $\hat{x}$ of the second MVD component x comprises all but the least significant bit of the second MVD component x, LSB(x), which is instead embedded in the parity information of the first MVD component y:

$$LSB(x)=LSB(y).$$

For example, if the MVD is (4, −8), i.e. x=4 and y=−8, then the second MVD component's least significant bit 0 can be derived using the parity of the first MVD component. Thus, only (2, −8) will be encoded.

According to this embodiment, the second MVD component x is reconstructed as:

$$x=2\hat{x}+LSB(y).$$

Figure 3:
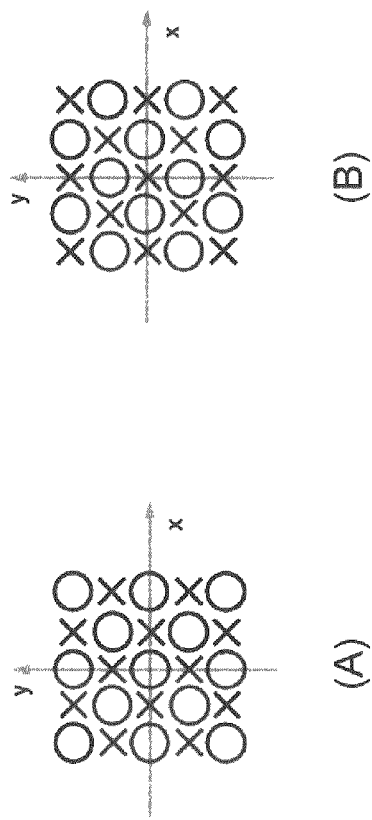
FIGS. 3 (A) and (B) illustrate examples of motion vector search patterns according to an embodiment of the present invention.

Setting a condition LSB(x)=LSB(y) may imply that, on the video encoder side, a motion vector search pattern as shown in FIG. 3(A) may be applied when searching for the best motion vector around a certain MVP. The circles correspond to allowed MV positions, i.e. the positions for which LSB(x)=LSB(y), while crosses indicate disallowed positions, i.e. LSB(x)≠LSB(y). By using this search pattern it is assured that the condition LSB(x)=LSB(y), in which case the second MVD component x can always be reconstructed as above.

Another alternative is to embed the second MVD component's LSB using the inverse parity of the first MVD component y. In this case, a motion search pattern as shown in FIG. 3(B) may be applied on the encoder side.

Similar as above, this embodiment may also be generalized to use other bit than the LSB to be embedded in a corresponding bit from another motion vector component.

Figure 4:
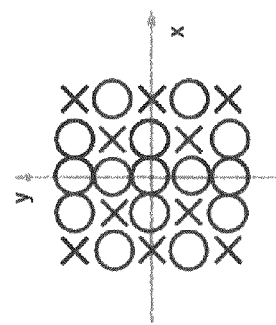
FIG. 4 illustrates a motion vector search pattern according to an embodiment of the present invention.

According to another version of this embodiment, when reconstructing, instead of always multiplying the second MVD component's magnitude by two and adding the LSB of the first MVD component's magnitude, the procedure depends on the value of the second MVD component. For example, when this value is 0, no modification is made. When the value is smaller than 0, it is multiplied by 2 and the LSB of the first component's magnitude is added. When it is larger than 0, it is multiplied by 2, and the inverse of the LSB of the y component's magnitude is subtracted. In this case, a motion vector search pattern as shown in FIG. 4 may be applied by the video encoder. The benefit of this is that the commonly used motion vectors (0,0), (0,1), (1,0), (0,−1) and (−1,0) can be all used and reconstructed, which leads to slightly better overall compression.

Similar as above, this embodiment may also be generalized to use a bit other than the LSB to be embedded in a corresponding bit from another MVD component.

Figure 5:
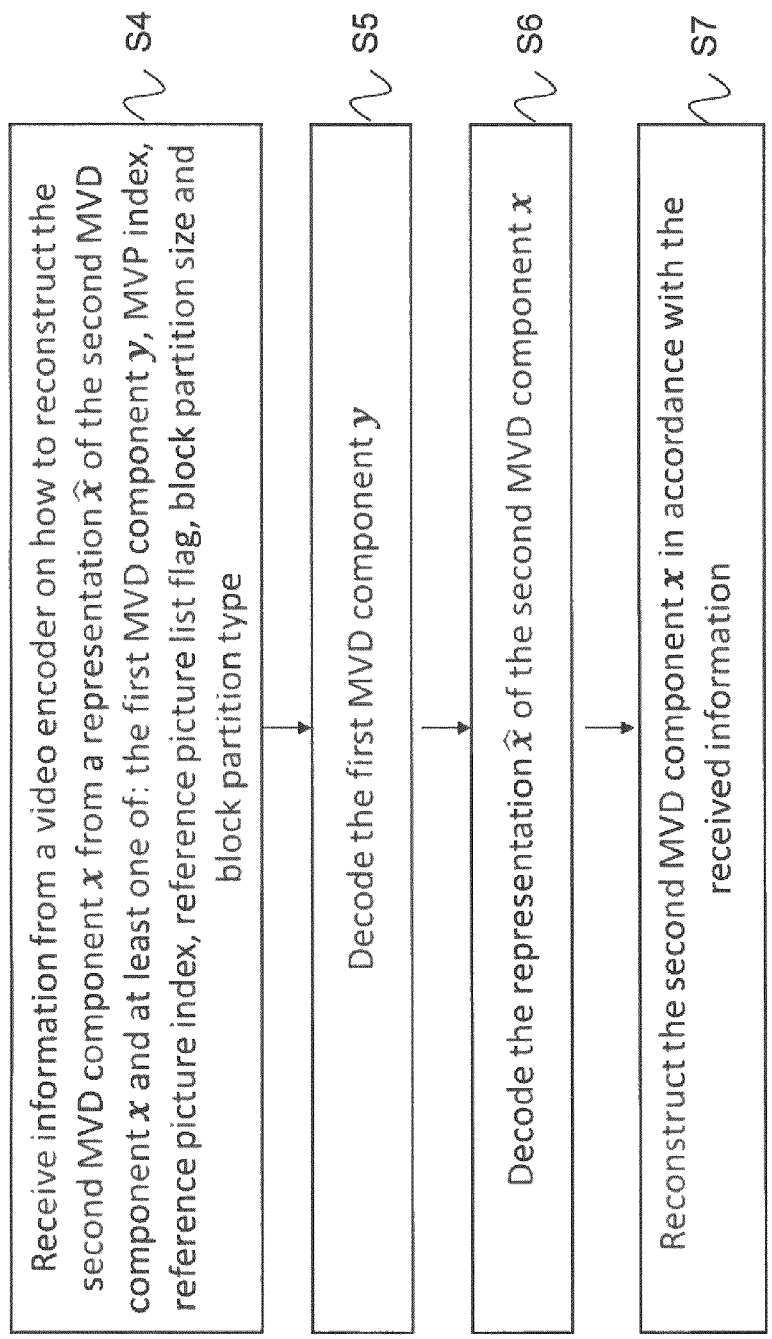
FIG. 5 illustrates the steps performed in a decoding method according to the embodiments of the present invention.

According to another aspect, a method, performed by a video decoder, for reconstructing a motion vector from a motion vector prediction and a motion vector difference is provided, as illustrated in FIG. 5. The MVD comprises a first MVD component y and a second MVD component x. The method comprises a step S4 of receiving information from a video encoder on how to reconstruct the second MVD component x from a representation $\hat{x}$ of the second MVD component x and at least one of: the first MVD component y, MVP index MVPindex, reference picture index RefIdx, reference picture list flag, block partition size PartSize and block partition type. This ensures a correct reconstruction of the second MVD component x. The received information may be signaled by using a sequence parameter set, picture parameter set or video parameter set, as mentioned above. The video encoder and the video decoder may as well exchange in advance the details of the reconstruction process.

The method comprises a step S5 of decoding the first MVD component y. The method further comprises a step S6 of decoding the representation $\hat{x}$ of the second MVD component x. Similar as described in step S2 above, the representation $\hat{x}$ may be a reduced size version of the second MVD component x and may, for example, be obtained by removing at least one bit of the second MVD component x. Typically, the representation may contain all but the least significant bit of the second MVD component, in which case the parity of the second MVD component is removed, or all but the most significant bit of the second MVD component, in which case the sign of the MVD component is removed and the representation corresponds to the magnitude of the second MVD component.

The method further comprises a step S7 of reconstructing the second MVD component x in accordance with the received information.

According to an embodiment, which is combined with the first encoder embodiment, the representation $\hat{x}$ of the second MVD component x corresponds to a magnitude of the second MVD component x, and a sign of the second MVD component x is calculated as:

$$\text{Sign}(x)=(\text{Magnitude}(x) \text{ XOR Magnitude}(y) \text{ XOR PartSize XOR RefIdx}) \text{ AND } 0x01.$$

The reconstruction process in this embodiment is identical to the one described in the first encoder embodiment. For more details, please refer to the related section above.

According to another embodiment, which is related to the second encoder embodiment above, the representation $\hat{x}$ of the second MVD component x comprises all but the least significant bit of the second MVD component x, LSB(x). The second MVD component x is reconstructed as:

$$x=2\hat{x}+((LSB(y) \text{ XOR MVPindex}) \text{ AND } 0x01).$$

According to yet another embodiment, which is related to the third encoder embodiment above, the representation $\hat{x}$ of the second MVD component x comprises all but the least significant bit of the second MVD component x, LSB(x). The second MVD component x is reconstructed as:

$$x=2\hat{x}+((\text{LSB}(y)\text{ XOR MVPindex XOR RefIdx XOR PartSize}) \text{ AND } 0x01).$$

According to yet another embodiment, which is related to the fourth encoder embodiment above, the representation $\hat{x}$ of the second MVD component x comprises all but the least significant bit of the second MVD component x, LSB(x). The second MVD component x is reconstructed as:

$$x=2\hat{x}+\text{LSB}(y).$$

Figure 6:
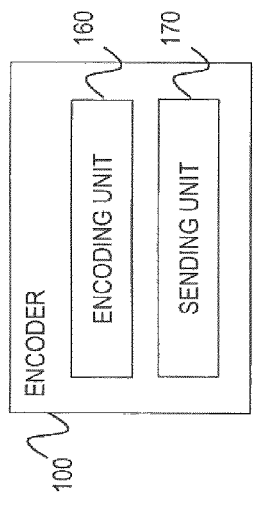
FIG. 6 depicts a schematic block diagram illustrating functional units of a video encoder for encoding a motion vector according to embodiments of the present invention.

FIG. 6 is a schematic block diagram of a video encoder 100, for encoding a motion vector, wherein the motion vector is represented by a sum of a motion vector prediction and a motion vector difference between the motion vector and the MVP. The MVD comprises a first MVD component y and a second MVD component x. The video encoder 100 comprises, according to this aspect, an encoding unit 160, configured to encode the first MVD component y and to encode a representation $\hat{x}$ of the second MVD component x. The video encoder 100 comprises, according to this aspect, a sending unit 170, configured to send information to a video decoder on how reconstruct the second MVD component x from the representation $\hat{x}$ of the second MVD component x and at least one of: the first MVD component y, MVP index MVPindex, reference picture index RefIdx, reference picture list flag, block partition size PartSize and block partition type.

The encoding 160 and sending 170 units may be hardware based, software based (in this case they are called encoding and sending modules respectively) or may be a combination of hardware and software.

The encoder 100 may be an HEVC encoder or any other state of the art or future video encoder.

The sending unit 170 may send information to the video decoder that the representation $\hat{x}$ of the second MVD component x corresponds to a magnitude of the second MVD component x, and that the sign of the second MVD component x is reconstructed as:

$$\text{Sign}(x)=(\text{Magnitude}(x)\text{ XOR Magnitude}(y)\text{ XOR PartSize XOR RefIdx}) \text{ AND } 0x01,$$

wherein XOR is an exclusive OR logical operation, and AND is a logical AND operation.

The sending unit 170 may send information to the video decoder that the representation $\hat{x}$ of the second MVD component x comprises all but the least significant bit of the second MVD component x, LSB(x), and that the second MVD component x is reconstructed as:

$$x=2\hat{x}+((\text{LSB}(y)\text{ XOR MVPindex}) \text{ AND } 0x01).$$

The sending unit 170 may send information to the video decoder that the representation $\hat{x}$ of the second MVD component x comprises all but the least significant bit of the second MVD component x, LSB(x), and that the second MVD component x is reconstructed as:

$$x=2\hat{x}+((\text{LSB}(y)\text{ XOR MVPindex XOR RefIdx XOR PartSize}) \text{ AND } 0x01).$$

The sending unit 170 may send information to the video decoder that the representation $\hat{x}$ of the second MVD component x comprises all but the least significant bit of the second MVD component x, LSB(x), and that the second MVD component x is reconstructed as:

$$x=2\hat{x}+\text{LSB}(y).$$

The video encoder 100 can be implemented in hardware, in software or a combination of hardware and software. The video encoder 100 can be implemented in user equipment, such as a mobile telephone, tablet, desktop, netbook, multimedia player, video streaming server, set-top box or computer. The video encoder 100 may also be implemented in a network device in the form of or connected to a network node, such as radio base station, in a communication network or system.

Although the respective units disclosed in conjunction with FIG. 6 have been disclosed as physically separate units in the device, where all may be special purpose circuits, such as ASICs (Application Specific Integrated Circuits), alternative embodiments of the device are possible where some or all of the units are implemented as computer program modules running on a general purpose processor. Such an embodiment is disclosed in FIG. 7.

Figure 7:
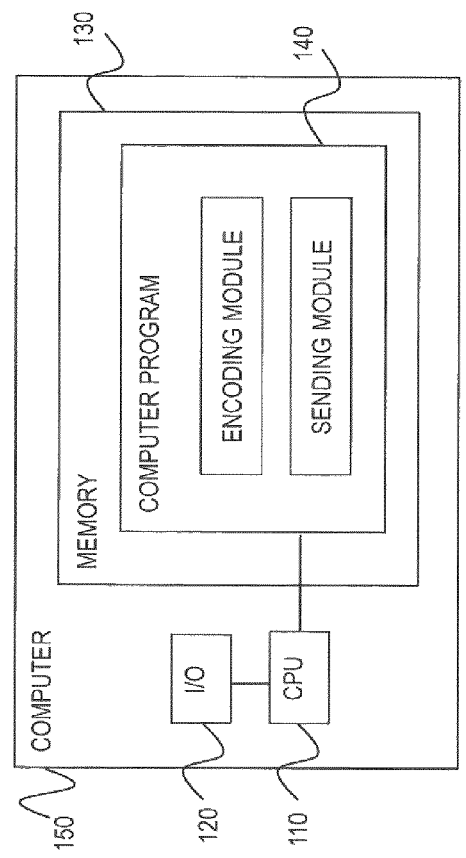
FIG. 7 illustrates a schematic block diagram illustrating a computer comprising a computer program product with a computer program for encoding a motion vector, according to embodiments of the present invention.

FIG. 7 schematically illustrates an embodiment of a computer 150 having a processing unit 110 such as a DSP (Digital Signal Processor) or CPU (Central Processing Unit). The processing unit 110 can be a single unit or a plurality of units for performing different steps of the method described herein. The computer also comprises an input/output (I/O) unit 120 for receiving a video sequence. The I/O unit 120 has been illustrated as a single unit in FIG. 6 but can likewise be in the form of a separate input unit and a separate output unit.

Furthermore, the computer 150 comprises at least one computer program product 130 in the form of a non-volatile memory, for instance an EEPROM (Electrically Erasable Programmable Read-Only Memory), a flash memory or a disk drive. The computer program product 130 comprises a computer program 140, which comprises code means which, when run on the computer 150, such as by the processing unit 110, causes the computer 150 to perform the steps of the method described in the foregoing in connection with FIG. 2.

Figure 8:
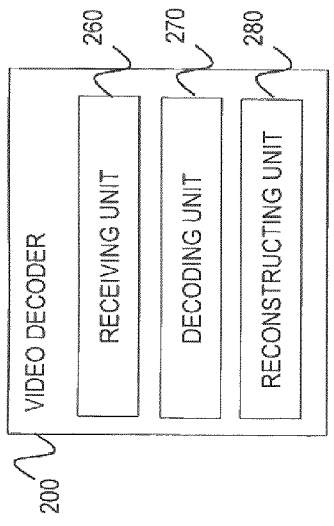
FIG. 8 depicts a schematic block diagram illustrating functional units of a video decoder for reconstructing a motion vector, according to an embodiment of the present invention.

FIG. 8 is a schematic block diagram of a video decoder 200 for reconstructing a motion vector from a motion vector prediction and a motion vector difference, wherein the motion vector difference comprises a first MVD component y and a second MVD component x. The video decoder 200 comprises, according to this aspect, a receiving unit 260, configured to receive information from a video encoder 100 on how to reconstruct the second MVD component x from a representation $\hat{x}$ of the second MVD component x and at least one of: the first MVD component y, MVP index MVPindex, reference picture index RefIdx, reference picture list flag, block partition size PartSize and block partition type. The video decoder 200 comprises, according to this aspect, a decoding unit 270, configured to decode the first MVD component y and to decode the representation $\hat{x}$ of the second MVD component x. The video decoder comprises, according to this aspect, a reconstructing unit 280, configured to reconstruct the second MVD component x in accordance with the received information.

The receiving 260, decoding 270 and reconstructing 280 units may be hardware based, software based (in this case they are called receiving, decoding and reconstructing modules respectively) or may be a combination of hardware and software.

The video decoder 200 may be an HEVC decoder or any other state of the art or future video decoder.

The reconstructing unit 280 may, when the representation $\hat{x}$ of the second MVD component x corresponds to a magnitude of the second MVD component x, reconstruct the sign of the second MVD component x as:

$$\text{Sign}(x) = (\text{Magnitude}(x) \text{ XOR Magnitude}(y) \text{ XOR PartSize XOR RefIdx}) \text{ AND } 0x01,$$

wherein XOR is an exclusive OR logical operation, and AND is a logical AND operation.

The reconstructing unit 280 may, when the representation $\hat{x}$ of the second MVD component x comprises all but the least significant bit of the second MVD component x, LSB(x), reconstruct the second MVD component x as:

$$x = 2\hat{x} + ((\text{LSB}(y) \text{ XOR MVPindex}) \text{ AND } 0x01).$$

The reconstructing unit 270 may, when the representation $\hat{x}$ of the second MVD component x comprises all but the least significant bit of the second MVD component x, LSB(x), reconstruct the second MVD component x as:

$$x = 2\hat{x} + ((\text{LSB}(y) \text{ XOR MVPindex XOR RefIdx XOR PartSize}) \text{ AND } 0x01).$$

The reconstructing unit 270 may, when the representation $\hat{x}$ of the second MVD component x comprises all but the least significant bit of the second MVD component x, LSB(x), reconstruct the second MVD component x as:

$$x = 2\hat{x} + \text{LSB}(y).$$

The video decoder 200 can be implemented in hardware, in software or a combination of hardware and software. The video decoder 200 can be implemented in user equipment, such as a mobile telephone, tablet, desktop, netbook, multimedia player, video streaming server, set-top box or computer. The video decoder 200 may also be implemented in a network device in the form of or connected to a network node, such as radio base station, in a communication network or system.

Although the respective units disclosed in conjunction with FIG. 8 have been disclosed as physically separate units in the device, where all may be special purpose circuits, such as ASICs (Application Specific Integrated Circuits), alternative embodiments of the device are possible where some or all of the units are implemented as computer program modules running on a general purpose processor. Such an embodiment is disclosed in FIG. 9.

Figure 9:
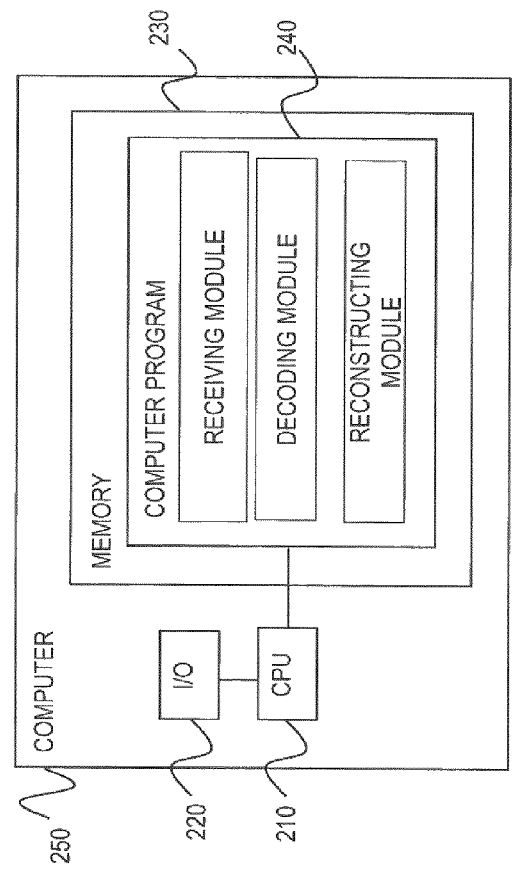
FIG. 9 illustrates a schematic block diagram illustrating a computer comprising a computer program product with a computer program for reconstructing a motion vector, according to an embodiment of the present invention.

FIG. 9 schematically illustrates an embodiment of a computer 250 having a processing unit 210 such as a DSP (Digital Signal Processor) or CPU (Central Processing Unit). The processing unit 210 can be a single unit or a plurality of units for performing different steps of the method described herein. The computer also comprises an input/output (I/O) unit 220 for receiving a video bitstream. The I/O unit 220 has been illustrated as a single unit in FIG. 9 but can likewise be in the form of a separate input unit and a separate output unit.

Furthermore, the computer 250 comprises at least one computer program product 230 in the form of a non-volatile memory, for instance an EEPROM (Electrically Erasable Programmable Read-Only Memory), a flash memory or a disk drive. The computer program product 230 comprises a computer program 240, which comprises code means which, when run on the computer 250, such as by the processing unit 210, causes the computer 250 to perform the steps of the method described in the foregoing in connection with FIG. 5.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible.

The invention claimed is:

1. A method, performed by a video encoder, for encoding a motion vector, wherein the motion vector is represented by a sum of a motion vector prediction (MVP) and a motion vector difference (MVD) between the motion vector and the MVP, wherein the MVD comprises a first MVD component y and a second MVD component x, the method comprising:
   encoding the first MVD component y;
   encoding a representation $\hat{x}$ of the second MVD component x;
   sending information to a video decoder on how reconstruct the second MVD component x from the representation $\hat{x}$ of the second MVD component x and at least one of: the first MVD component y, MVP index (MVPindex), reference picture index (RefIdx), reference picture list flag, block partition size (PartSize), or block partition type;
   wherein the representation $\hat{x}$ of the second MVD component x corresponds to a magnitude of the second MVD component x; and
   wherein the sign of the second MVD component x is reconstructed as:

$$\text{Sign}(x) = (\text{Magnitude}(x) \text{ XOR Magnitude}(y) \text{ XOR PartSize XOR RefIdx}) \text{ AND } 0x01,$$

wherein XOR is an exclusive OR logical operation, and AND is a logical AND operation.

2. A method, performed by a video decoder, for reconstructing a motion vector from a motion vector prediction (MVP) and a motion vector difference (MVD), wherein the MVD comprises a first MVD component y and a second MVD component x, the method comprising:
   receiving information from a video encoder on how to reconstruct the second MVD component x from a representation $\hat{x}$ of the second MVD component x and at least one of: the first MVD component y, MVP index (MVPindex), reference picture index (RefIdx), reference picture list flag, block partition size (PartSize), or block partition type;
   decoding the first MVD component y;
   decoding the representation $\hat{x}$ of the second MVD component x;
   reconstructing the second MVD component x in accordance with the received information;
   wherein the representation $\hat{x}$ of the second MVD component x corresponds to a magnitude of the second MVD component x; and
   wherein a sign of the second MVD component x is calculated as:

$$\text{Sign}(x) = (\text{Magnitude}(x) \text{ XOR Magnitude}(y) \text{ XOR PartSize XOR RefIdx}) \text{ AND } 0x01,$$

wherein XOR is an exclusive OR logical operation, AND is a logical AND operation.

3. A video encoder, for encoding a motion vector, wherein the motion vector is represented by a sum of a motion vector prediction (MVP) and a motion vector difference (MVD) between the motion vector and the MVP, wherein the MVD comprises a first MVD component y and a second MVD component x, the video encoder comprising:
   processing circuitry; and
   memory comprising instructions executable by the processing circuitry whereby the video encoder is operative to:

encode the first MVD component y;

encode a representation x̂ of the second MVD component x;

send information to a video decoder on how reconstruct the second MVD component x from the representation x̂ of the second MVD component x and at least one of: the first MVD component y, MVP index (MVPindex), reference picture index (RefIdx), reference picture list flag, block partition size (PartSize), or block partition type;

wherein the representation x̂ of the second MVD component x corresponds to a magnitude of the second MVD component x; and wherein the sign of the second MVD component x is reconstructed as:

Sign($x$)=(Magnitude($x$)XOR Magnitude($y$)XOR PartSize XOR RefIdx) AND 0x01, wherein XOR is an exclusive OR logical operation, AND is a logical AND operation.

4. A video decoder, for reconstructing a motion vector from a motion vector prediction (MVP) and a motion vector difference (MVD), wherein the MVD comprises a first MVD component y and a second MVD component x, the video decoder comprising:

processing circuitry;

memory containing instructions executable by the processing circuitry whereby the video decoder is operative to:

receive information from a video encoder on how to reconstruct the second MVD component x from a representation x̂ of the second MVD component x and at least one of: the first MVD component y, MVP index (MVPindex), reference picture index (RefIdx), reference picture list flag, block partition size (PartSize), or block partition type;

decode the first MVD component y;

decode the representation x̂ of the second MVD component x;

reconstruct the second MVD component x in accordance with the received information;

wherein the representation x̂ of the second MVD component x corresponds to a magnitude of the second MVD component x; and wherein a sign of the second MVD component x is calculated as:

Sign(x)=(Magnitude(x)XOR Magnitude(y)XOR PartSize XOR RefIdx) AND 0x01, wherein XOR is an exclusive OR logical operation, AND is a logical AND operation.

* * * * *